United States Patent [19]
Harrison, Jr.

[11] Patent Number: 4,623,033
[45] Date of Patent: Nov. 18, 1986

[54] AIR RELEASE IN SEISMIC SOURCE AIR GUN
[75] Inventor: Earnest R. Harrison, Jr., Plano, Tex.
[73] Assignee: Texas Instruments Incorporated, Dallas, Tex.
[21] Appl. No.: 499,055
[22] Filed: May 27, 1983
[51] Int. Cl.⁴ .......................... G01V 1/04; G01V 1/38; H04R 1/02
[52] U.S. Cl. ..................... 181/120; 367/144
[58] Field of Search ......... 367/141, 144, 23; 181/115, 117, 118, 119, 120, 116; 124/56, 70, 71, 73; 89/28.1, 28.05, 156, 191.05; 102/222, 262, 531

[56] References Cited
U.S. PATENT DOCUMENTS

| | | | |
|---|---|---|---|
| 3,374,854 | 3/1968 | Kilmer et al. | 181/116 |
| 3,638,752 | 2/1972 | Wakefield | 367/144 X |
| 3,997,021 | 12/1976 | Chelminski | 367/144 X |
| 4,211,300 | 7/1980 | Miller | 367/144 X |
| 4,219,097 | 8/1980 | Harrison et al. | 367/144 X |
| 4,219,098 | 8/1980 | Thomson et al. | 367/144 X |
| 4,225,009 | 9/1980 | Harrison et al. | 181/115 X |
| 4,230,201 | 10/1980 | Bays | 367/144 X |
| 4,240,518 | 12/1980 | Chelminski | 367/144 |
| 4,246,979 | 1/1981 | Thomson et al. | 367/144 X |
| 4,364,446 | 12/1982 | Thomas et al. | 367/144 X |
| 4,472,794 | 9/1984 | Chelminski | 367/144 |

Primary Examiner—Jordan Charles T.
Assistant Examiner—Brian S. Steinberger
Attorney, Agent, or Firm—Thomas G. Devine; Leo N. Heiting; Melvin Sharp

[57] ABSTRACT

A seismic energy source air gun has a body with an air chamber formed therein that opens 360 degrees around the periphery of the body. A sleeve-type shuttle covers the opening in a pre-fire condition. When the air gun is fired, the shuttle moves rapidly away from the opening providing a large area for compressed air held in the chamber to escape. This very quick release maximizes the acoustic output. The movement of the shuttle is ultimately controlled by a solenoid which, when activated, causes the shuttle to move away from the 360 degree opening and when deactivated permits the shuttle to move back into the pre-fire position over the 360 degree opening.

14 Claims, 5 Drawing Figures

AIR RELEASE IN SEISMIC SOURCE AIR GUN

BACKGROUND OF THE INVENTION

1. Field of the Invention

This invention relates to the generation of seismic energy in water by the use of seismic sources of the pressurized gas abrupt releasing type and more particularly to apparatus for permitting maximum acoustic output at the earliest possible time.

2. Description of the Prior Art

In marine seismic exploration, a source of acoustic energy is released into the water every few seconds to obtain appropriate acoustic waves that propagate into the earth's surface. These waves are reflected at interfaces of the subsurface formations and propagated back to instruments where transducers convert the acoustic waves to electronic signals which are recorded and later processed into a record section for interpretation of the subsurface formations.

In recent times, the major marine seismic energy source has been the air gun. These air guns release high pressure air, typically 2,000 psi to 6,000 psi into the water to create the desired acoustic wave.

Current air guns each normally comprise an annular housing that contains means for discharging compressed air through exhaust ports in the housing. Compressed air is stored within the housing in a firing chamber. The only moving component (except for the solenoid triggering device) is a shuttle, which when raised, permits air to escape from the firing chamber through the ports in the main housing into the surrounding water. The size of the gun is determined by the firing chamber volume selected. By having a constant source of compressed air through an inlet passage in the housing, the upper chamber containing the shuttle is filled and forces the shuttle into a sealed position, closing off all exhaust ports from the firing chamber. By using a solenoid valve to allow air flow underneath the shuttle flange, thus forcing the shuttle upward and causing an uequal pressure on the shuttle, the shuttle is accelerated in the upward direction exposing the chamber exhaust ports and allowing compressed air to escape into the surrounding water. When the shuttle is in the down, or pre-fire position, the air gun is charged and ready for firing. When fired, this air gun allows 80% to 90% of the air in the firing chamber to be exhausted into the water.

A more recent air gun is described and claimed in U.S. Pat. No. 4,230,201, assigned to the assignee of this invention. This air gun has a shuttle control that closes the exhaust ports before all of the compressed air in the firing chamber of the air gun is exhausted. By preventing further discharge of air, secondary pulses are greatly reduced and the supply of air requirement is reduced.

Other prior art air guns include internal and external sleeve-type shuttle air guns. These devices are described and claimed in U.S. Pat. Nos. 4,225,009 and 4,219,097, respectively, assigned to the assignee of this invention. In these and other prior art sleeve type air guns, the port area is much smaller than in the sleeve type air gun of this invention. Furthermore, in the prior art, when the shuttle is released, there is no further control, the shuttle returning to its pre-fire condition only by virtue of air pressure dropping to some predetermined level.

BRIEF SUMMARY OF THE INVENTION

A seismic energy source air gun is activated and deactivated by a solenoid that controls the flow of compressed air. The air gun, in this preferred embodiment, has an annular housing which in turn has formed within it, a primary chamber for storing compressed air. The primary chamber opens 360 degrees around the periphery of the housing, surrounding a center post section of the body. An external sleeve type shuttle surrounds the body and covers the 360 degree opening in a pre-fire position. The shuttle is held in the pre-fire position by pressure supplied from a control chamber (in this preferred embodiment) which is formed within the body and bears against a surface of the shuttle, with the air pressure being supplied by a supply of compressed air.

A firing chamber is formed within the body of the housing and a surface of the shuttle, this surface being larger than that used for the control chamber.

When the solenoid is activated by an electrical signal, compressed air is permitted to flow into the firing chamber with the resultant force being larger than the holding force of the control chamber, thereby causing the shuttle to abruptly slide along the outside surface of the body, suddenly and continuously opening the 360 degree port of the primary chamber. Compressed air from the primary chamber is thus released suddenly into the surrounding water.

Until the compressed air filling the firing chamber is cut off, the shuttle will remain in a fired position. When the solenoid is deactivated (by removing the signal in this preferred embodiment) the shuttle then is able to move back into the pre-fire position under the influence of the pressure from the control chamber. The movement of the shuttle is thereby completely controlled by the solenoid.

The main object of this invention is to provide a seismic energy source air gun which allows a very rapid release of the stored air to maximize the acoustic output.

Another object of this invention is to provide a seismic energy source air gun that has a 360 degree exhaust port opening into the periphery of the body of the air gun.

Still another object of the invention is to provide a seismic energy source air gun whose shuttle for releasing air is controlled entirely by a solenoid.

These and other objects will be made evident in the detailed description that follows.

DETAILED DESCRIPTION OF THE INVENTION

This inventive seismic energy source air gun is technically advantageous in that it has a 360 degree port for very rapidly exhausting compressed air into the surrounding water. An external sleeve shuttle is employed to uncover the annular port when the air gun is fired. The external sleeve permits a full 360 degree exhaust flow area which increases as the sleeve moves. The air exhaust flow area is only limited by the stroke of the shuttle. This action produces a very large acoustic output.

A solenoid is connected to receive an electrical firing signal. When the signal is received, the solenoid diverts compressed air to move the shuttle to open the 360 degree port. The shuttle is under control of the solenoid and is not able to return to the pre-fire position until the solenoid is de-energized.

This inventive air gun is generally smaller in size than existing air guns, requiring less pressurized air and less force necessary to move the shuttle. Also, the center support structure required for the 360 degree port necessarily forces the pressurized air closer to the surface which then aids in the rapid discharge when the 360 degree port is opened.

Figure 1:
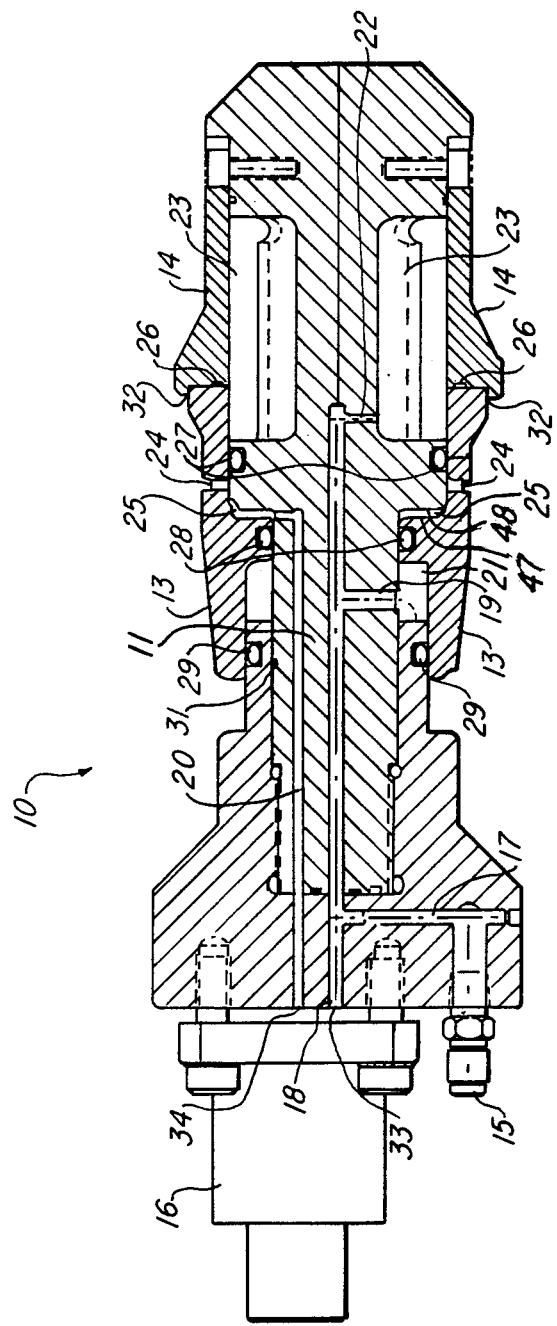
FIG. 1 is a cross section of the seismic energy source air gun.

FIG. 1 is a cross section of the preferred embodiment of this invention. The air gun 10 is shown having body 11 with primary chamber 23 formed therein and formed around center post 46. Sleeve-shuttle 13 encircles body 11 and abuts primary chamber sleeve 14 at intensifier 32 and seal 26. Chamber sleeve 14 forms a lip at the intensifier 32. This feature will be discussed in regard to the operation of the air gun.

The firing chamber 25 is formed by surface 47 of shuttle 13 and surface 48 of body 11. Seals 27, 28 and 29 are located as shown to prevent air leakage. Solenoid 16 is shown attached to body 11, having inlet 33 from orifice 18 and outlet 34 to orifice 20. Compressed air is provided at fixture 15 and connects to orifice 18. Orifice 18 is connected to control chamber 21 and primary chamber 23 through passages 19 and 22, respectively. Orifice 20 is connected to firing chamber 25. When solenoid 16 is activated, compressed air from fixture 15 travels into the solenoid through inlet 33 and out through outlet 34 into orifice 20 and then to the firing chamber 25. Vent 24 in shuttle 13 provides venting for the firing chamber 25.

Figure 2:
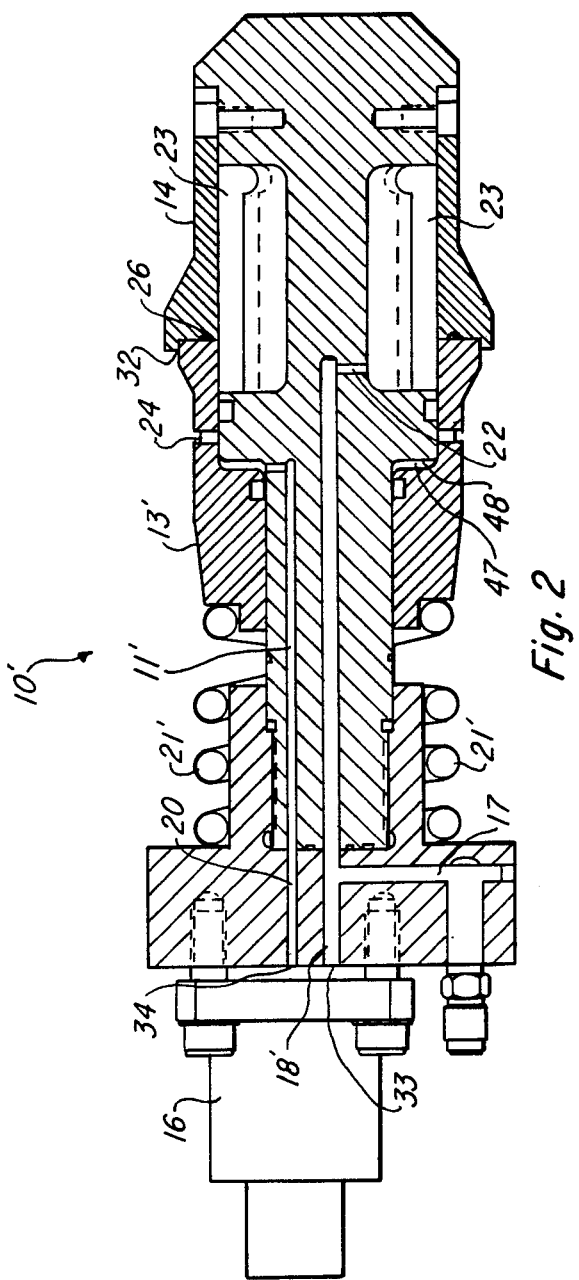
FIG. 2 is a cross section of an alternate embodiment of the seismic energy source air gun.

FIG. 2 illustrates air gun 10', identical to the preferred embodiment of FIG. 1 except that spring 21' has been substituted for control chamber 21. Spring 21' bears against body 11' and shuttle 13'.

Figure 3:
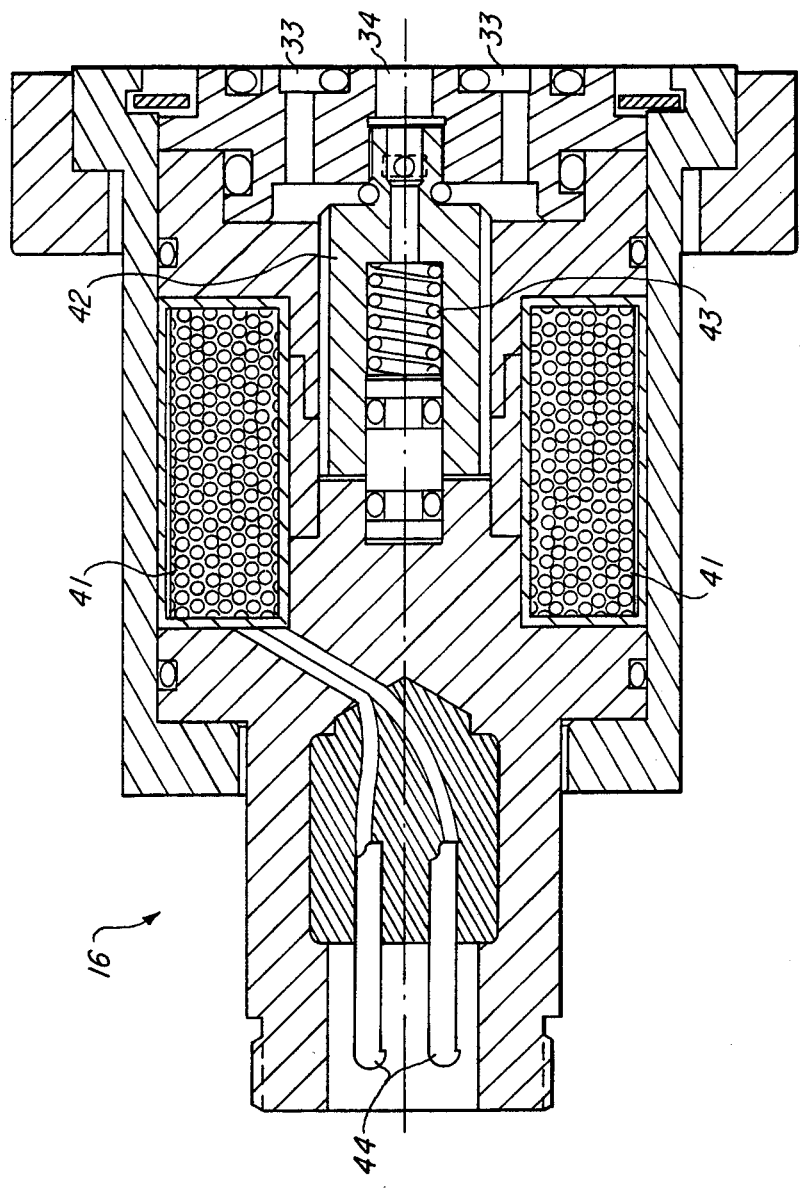
FIG. 3 is a cross section of the solenoid employed with the seismic energy source air gun.

FIG. 3 is a cross section of solenoid 16 shown in FIGS. 1 and 2. Terminals 44 receive an electrical signal from any one of a variety of sources such as a timing circuit, computer, etc. (not shown) to flow through coil 41. Solenoid plunger 42 is located adjacent the coil 41. Spring 43 is positioned to maintain plunger 42 in the position shown when deactivated. Air inlet 33 and air outlet 34 are shown indicating a connection made between them when the solenoid is activated.

MODE OF OPERATION

Figures 4A, 4B:
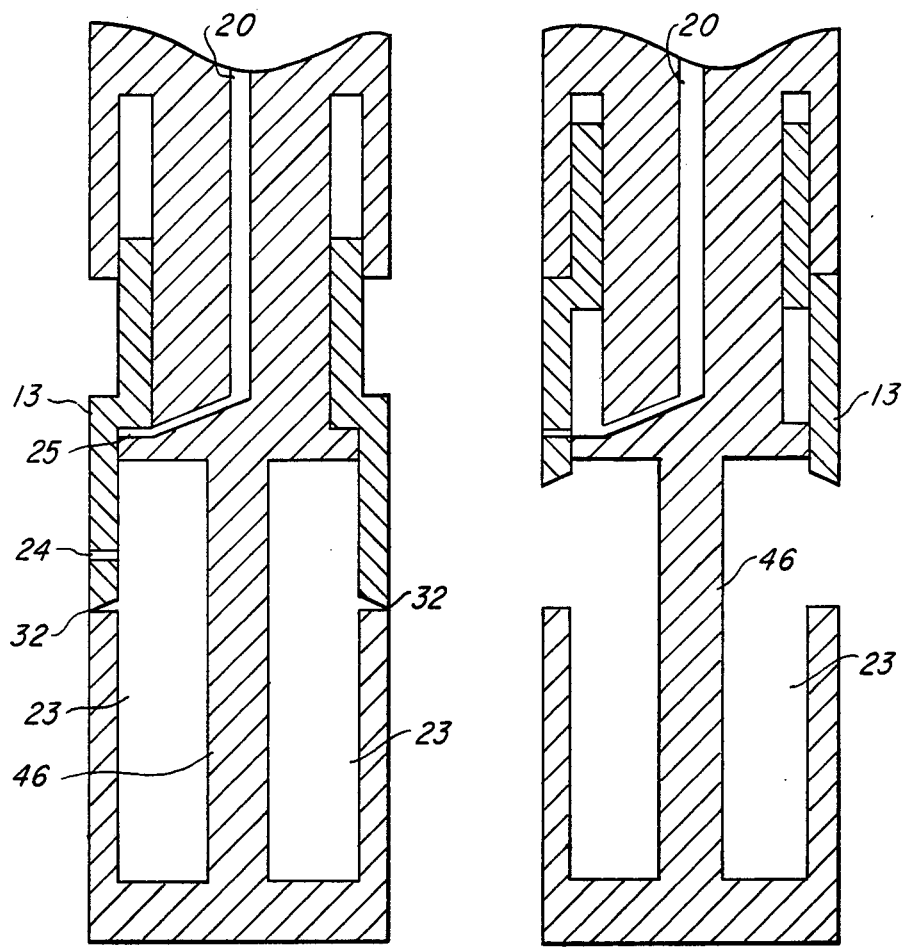
FIGS. 4A and 4B are schematic cross sections of the air gun illustrating the pre-fire and post-fire positions, respectively.

Referring to FIGS. 1 and 2, the high pressure air enters through fixture 15, feeds in through orifice 18 into control chamber 21 and primary chamber 23 through channels 19 and 22, respectively. Solenoid 16 is not activated at this point and the solenoid plunger 42 is in position as shown in FIG. 3. The pressure in control chamber 21 caused by the incoming high pressure air causes the sleeve shuttle 13 to move to the right. Pressure building up in primary chamber 23 has very little area (around seal 26) to bear against the sleeve shuttle 13 and therefore becomes equalized with the pressure in the control chamber 21. At this point, shuttle 13 is in the pre-fire position and the gun is ready to fire. FIG. 4A represents this pre-fire condition in a schematic manner.

To fire the gun, an electrical signal is applied to terminals 44 of solenoid 16 of FIG. 3. Coil 41 is thereby activated, moving plunger 42 to the left. When plunger 42 moves to the left, a path is completed between inlet 33 and outlet 34, permitting high pressure air from fixture 15 to be transmitted through orifice 20 to firing chamber 25.

When firing chamber 25 receives the high pressure air, it begins to force shuttle 13 to the left. Also, when shuttle 13 moves to the left, intensifier 32 begins to spread apart, but the compressed air is not permitted to escape by reason of the lip formed by chamber sleeve 14. The trapped, compressed air at intensifier 32 aids firing chamber 25 in moving shuttle 13 rapidly to the left. As shuttle 13 moves to the left, air is released through the 360 degrees port opened by the movement of shuttle 13. FIG. 4B schematically illustrates shuttle 13 in its post-fire position. p If solenoid 16 is kept activated, then the high pressure remains present in orifice 20. With shuttle 13 moved to the left, firing chamber 25 tends to exhaust through orifice 24. Shuttle 13 then tends to move to the right because of pressure in control chamber 21 but is immediately moved back to the left by the pressure in firing chamber 25 as the orifice 24 is moved away. This results in an oscillatory motion until solenoid 16 is deactivated, at which time the pressure in orifice 20 is dropped and the shuttle 13 is moved to the right, back to the pre-fire position as described above.

The specific, preferred embodiment of this invention is not intended to be limiting and the invention itself is limited only by the appended claims.

What is claimed is:

1. A seismic source apparatus having a selectively energizible actuator and a supply of compressed air, comprising:
   (a) a housing;
   (b) valve means, slidably mounted around the periphery of the housing;
   (c) arming means, bearing against the housing and the valve means to urge the valve means into a pre-fire position;
   (d) a primary chamber for storing compressed air, formed within the housing, opening 360 degrees around the periphery thereof, being positioned beneath the valve means in its pre-fire position;
   (e) a first orifice interconnecting the supply of compressed air with the actuator and the primary chamber for supplying compressed air to the primary chamber;
   (f) a second orifice connected to the actuator for interconnecting to the first orifice when the actuator is energized to fire the seismic source apparatus; and
   (g) a firing chamber formed between the surfaces of the housing and the valve means, connected to the second orifice for receiving compressed air when the seismic source apparatus is fired, thereby suddenly sliding the valve means away from the 360 degree opening of the primary chamber, abruptly releasing the compressed air from the primary chamber into the surrounding atmosphere.

2. The apparatus of claim 1 wherein the valve means comprises a shuttle.

3. The apparatus of claim 2 wherein the arming means comprises a control chamber, formed between surfaces of the housing and the shuttle, connected to the first orifice for receiving compressed air to hold the shuttle in the pre-fire position.

4. The apparatus of claim 3 wherein the area of the shuttle surface within the control chamber is less than the area of the shuttle surface within the firing chamber.

5. The apparatus of claim 2 wherein the arming means comprises a spring, positioned to bear against the housing and the shuttle to hold the shuttle in the pre-fire position.

6. The apparatus of claim 5 wherein the compression strength of the spring is selected to permit the spring to compress when the firing chamber receives the compressed air.

7. A seismic source apparatus having a supply of compressed air and a source of selectively applying an electrical signal, comprising:
   (a) a solenoid connected to the supply of compressed air, and connected to receive the electrical signal to be activated thereby;
   (b) a housing having a primary chamber forming an opening therein, 360 degrees around the periphery of the housing, connected to receive and store the compressed air;
   (c) valve means; slidably mounted to block the compressed air in the primary chamber when the valve means is in a pre-fire position;
   (d) a firing chamber, formed between surfaces of the housing and the valve means, connected to receive compressed air from the actuator means when activated thereby causing the valve means to suddenly slide away from the primary chamber, abruptly releasing the compressed air therefrom into the surrounding atmosphere; and
   (e) arming means, bearing against the valve means and the housing with a force adequate to slide the valve means back into the pre-fire condition when the actuator means is deactivated by removing the electrical signal.

8. The apparatus of claim 7 wherein the valve means comprises a sleeve-type shuttle that encircles the housing.

9. The apparatus of claim 8 wherein the arming means comprises a control chamber formed between surfaces of the housing and the shuttle.

10. The apparatus of claim 9 wherein the area of the shuttle surface within the control chamber is less than the area of the shuttle surface within the firing chamber.

11. The apparatus of claim 8 wherein the arming means comprises a spring positioned to bear against the housing means and the shuttle to hold the shuttle in the pre-fire position.

12. The apparatus of claim 11 wherein the compression strength of the spring is selected to permit the spring to compress when the firing chamber receives the compressed air.

13. A seismic source apparatus having a selectively energizable actuator and a supply of compressed air, comprising:
   (a) housing means;
   (b) primary chamber means connected to receive and store compressed air, formed within the housing means, opening 360 degrees around the periphery thereof;
   (c) valve means slidably mounted to block the compressed air in the primary chamber means when the valve means is in a pre-fire position;
   (d) arming means, bearing against the housing and the valve means to urge the valve means into the pre-fire position; and
   (e) firing chamber means formed between the surfaces of the housing means and the valve means, connected to receive compressed air from the actuator when the seismic source apparatus is fired, thereby suddenly sliding the valve means away from the 360 degree opening of the primary chamber means, abruptly releasing the compressed air from the primary chamber means into the surrounding atmosphere.

14. The apparatus of claim 13 wherein the valve means comprises a shuttle.

* * * * *